(12) United States Patent
Benbasat et al.

(10) Patent No.: US 9,690,417 B2
(45) Date of Patent: Jun. 27, 2017

(54) GLOVE TOUCH DETECTION

(71) Applicant: Apple Inc., Cupertino, CA (US)

(72) Inventors: Ari Y. Benbasat, San Francisco, CA (US); Wayne Carl Westerman, Burlingame, CA (US)

(73) Assignee: Apple Inc., Cupertino, CA (US)

( * ) Notice: Subject to any disclaimer, the term of this patent is extended or adjusted under 35 U.S.C. 154(b) by 281 days.

(21) Appl. No.: 14/284,357

(22) Filed: May 21, 2014

(65) Prior Publication Data

US 2015/0338983 A1 Nov. 26, 2015

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04106* (2013.01)

(58) Field of Classification Search
CPC ...... G06F 3/044; G06F 3/0412; G06F 3/0416; G06F 2203/04106
See application file for complete search history.

(56) References Cited

U.S. PATENT DOCUMENTS

| | | | |
|---|---|---|---|
| 5,483,261 A | 1/1996 | Yasutake | |
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,567,240 B2 | 7/2009 | Peterson, Jr. et al. | |

(Continued)

FOREIGN PATENT DOCUMENTS

| | | |
|---|---|---|
| EP | 0 618 528 A1 | 10/1994 |
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Latanya Bibbins
(74) *Attorney, Agent, or Firm* — Morrison & Foerster LLP

(57) ABSTRACT

The dynamic adjusting of the conditions for identifying inputs as touching a touch-sensitive device is discloses. In some examples, in addition to using a signal density make threshold to identify an input patch as touching the surface, a signal density stability threshold can be used to identify the input patch as touching the surface. In some examples, a weighted average of peak signal density contributions from recent identified touches can be computed to dynamically adjust the make threshold for new input patches. In other examples, a new input patch identified as associated with the same path as an earlier touch can have its "make" threshold dynamically adjusted based on the earlier touch without computing a weighted average.

20 Claims, 10 Drawing Sheets

(56) References Cited

U.S. PATENT DOCUMENTS

| | | | |
|---|---|---|---|
| 7,663,607 B2 | 2/2010 | Hotelling et al. | |
| 8,479,122 B2 | 7/2013 | Hotelling et al. | |
| 8,614,693 B2 | 12/2013 | King et al. | |
| 2006/0197753 A1 | 9/2006 | Hotelling | |
| 2008/0158145 A1 | 7/2008 | Westerman | |
| 2008/0158147 A1 | 7/2008 | Westerman et al. | |
| 2008/0158185 A1* | 7/2008 | Westerman | G06F 3/0488 345/173 |
| 2013/0154965 A1* | 6/2013 | Hwang | G06F 3/044 345/173 |
| 2013/0328616 A1 | 12/2013 | Buttolo et al. | |
| 2013/0328828 A1* | 12/2013 | Tate | G06F 3/044 345/174 |
| 2014/0002340 A1 | 1/2014 | Jordan et al. | |
| 2014/0043251 A1 | 2/2014 | Wilson et al. | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

GB Search Report dated Oct. 29, 2015, for GB Application No. GB1507972.6, one page.

* cited by examiner

GLOVE TOUCH DETECTION

FIELD OF THE DISCLOSURE

This relates to touch sensor panels used as input devices for computing systems, and more particularly, to techniques for dynamically adjusting the conditions for identifying inputs as touching a touch sensitive device.

BACKGROUND OF THE DISCLOSURE

Touch sensitive devices have become popular as input devices to computing systems due to their ease and versatility of operation as well as their declining price. A touch sensitive device can include a touch sensor panel, which can be a clear panel with a touch sensitive surface, and a display device, such as a liquid crystal display (LCD), that can be positioned partially or fully behind the panel or integrated with the panel so that the touch sensitive surface can cover at least a portion of the viewable area of the display device. The touch sensitive device can allow a user to perform various functions by touching the touch sensor panel using a finger, stylus, or other object at a location often dictated by a user interface (UI) being displayed by the display device. In general, the touch sensitive device can recognize a touch event and the position of the touch event on the touch sensor panel, and the computing system can then interpret the touch event in accordance with the display appearing at the time of the touch event, and thereafter can perform one or more actions based on the touch event.

Touch sensitive devices can be used in environments where an object touching a surface of the touch sensitive device can be separated from the surface by a barrier. For example, a user can be wearing a glove on one or both hands or can have a bandage on one or more fingers. The barrier can create a separation between the object and sensors of a touch sensor panel and degrade the sensors' ability to identify the object as touching the surface of the touch sensitive device.

SUMMARY OF THE DISCLOSURE

This relates to dynamically adjusting the conditions for identifying inputs as touching a touch-sensitive device. In some examples, in addition to using a signal density "make" threshold to identify an input patch as touching the surface, a signal density stability threshold can be used to identify the input patch as touching the surface. In some examples, a weighted average of peak signal density contributions from recent identified touches can be computed to dynamically adjust the "make" threshold for new input patches. In other examples, a new input patch identified as associated with the same path as an earlier touch can have its "make" threshold dynamically adjusted based on the earlier touch without computing a weighted average.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to dynamically adjusting the conditions for identifying inputs as touching a touch-sensitive device. In some examples, in addition to using a signal density "make" threshold to identify an input patch as touching the surface, a signal density stability threshold can be used to identify the input patch as touching the surface. In some examples, a weighted average of peak signal density contributions from recent identified touches can be computed to dynamically adjust the "make" threshold for new input patches. In other examples, a new input patch identified as associated with the same path as an earlier touch can have its "make" threshold dynamically adjusted based on the earlier touch without computing a weighted average.

Figure 1:
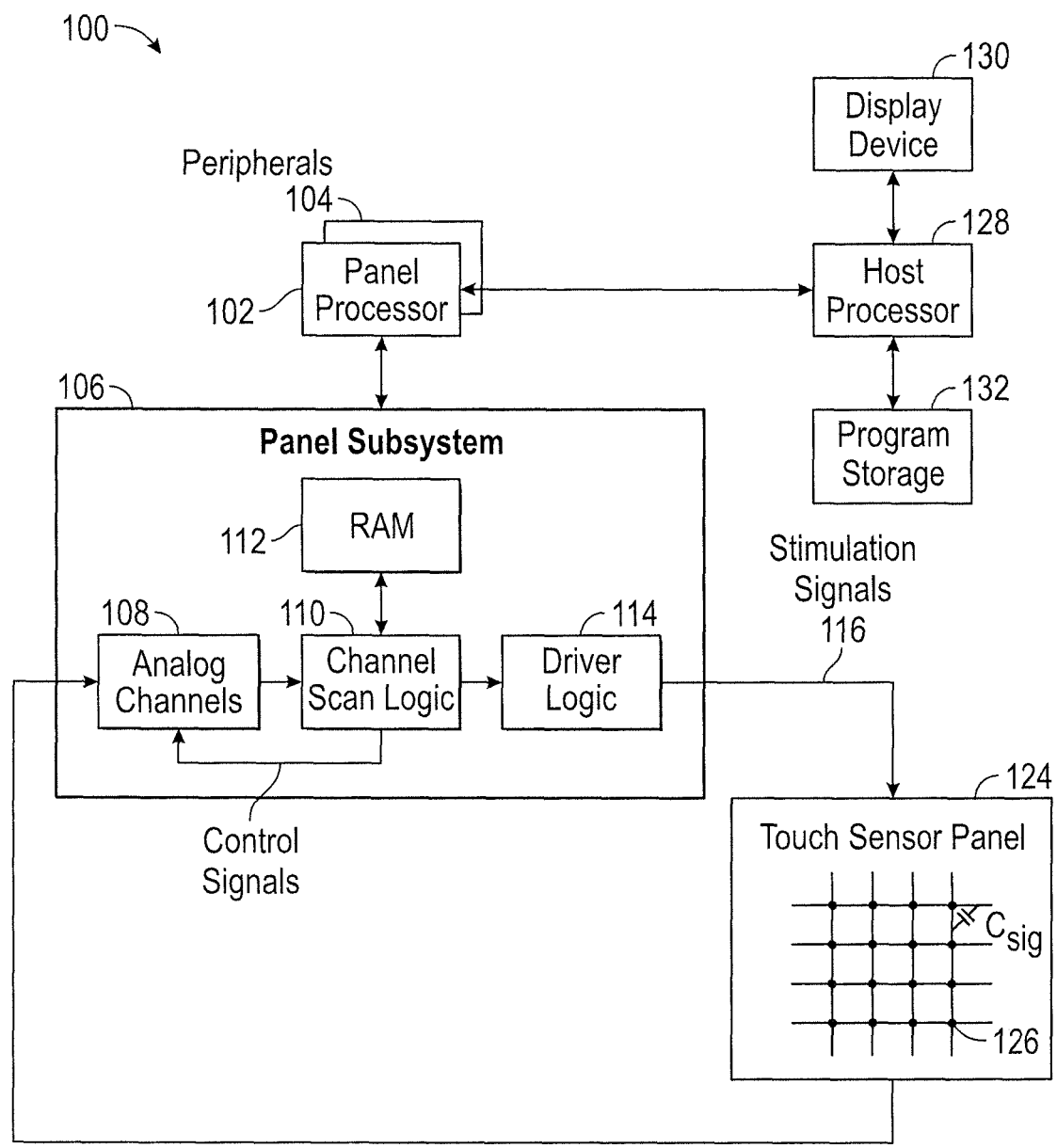
FIG. 1 illustrates an exemplary computing system capable of implementing an algorithm for dynamically adjusting the conditions for identifying input patches as touching a touch-sensitive device according to examples of the disclosure.

FIG. 1 illustrates an exemplary computing system capable of implementing an algorithm for dynamically adjusting the conditions for identifying input patches as touching a touch-sensitive device according to examples of the disclosure. Computing system 100 can include one or more panel processors 102, which can execute software or firmware implementing the algorithm for rejecting touch events according to examples of the disclosure, peripherals 104, and panel subsystem 106. Peripherals 104 can include, but are not limited to, random access memory (RAM) or other types of memory or storage, watchdog timers and the like. Panel subsystem 106 can include, but is not limited to, one or more sense channels 108, channel scan logic (analog or digital) 110 and driver logic (analog or digital) 114. Channel scan logic 110 can access RAM 112, autonomously read data from sense channels 108 and provide control for the sense channels. In addition, channel scan logic 110 can control driver logic 114 to generate stimulation signals 116 at various phases that can be simultaneously applied to drive lines of touch sensor panel 124. In some examples, panel subsystem 106, panel processor 102 and peripherals 104 can be integrated into a single application specific integrated circuit (ASIC).

Touch sensor panel 124 can include a capacitive sensing medium having a plurality of drive lines and a plurality of sense lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. The drive and sense lines can be formed on a single side of a substantially transparent substrate, on opposite sides of the substrate, or on two separate substrates separated by the dielectric material. Each intersection of drive and sense lines can represent a capacitive sensing node and can be viewed as picture element (pixel) 126, which can be particularly useful when touch sensor panel 124 is viewed as capturing an "image" of touch. (In other words, after panel subsystem 106 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel).) The capacitance between the drive and sense lines and local system ground can appear as a stray capacitance Cstray and the capacitance at the intersections of the drive and sense lines, i.e., the touch nodes, as a mutual signal capacitance Csig when the given drive line is stimulated with an alternating current (AC) signal. The presence of a finger or other object near or on the touch sensor panel can be detected by measuring changes to a signal charge present at the nodes being touched, which can be a function of Csig. Each sense line of touch sensor panel 124 can drive sense channel 108 in panel subsystem 106. Touch sensor panel 124 can cover a portion or substantially all of a surface of a device.

Computing system 100 can also include host processor 128 for receiving outputs from panel processor 102 and performing actions based on the outputs that can include, but are not limited to, moving one or more objects such as a cursor or pointer, scrolling or panning, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can execute software or firmware implementing the algorithm for dynamically adjusting the conditions for identifying input patches as touching a touch-sensitive device according to examples of the disclosure. Host processor 128 can also perform additional functions that may not be related to panel processing, and can be coupled to program storage 132 and display device 130 such as an LCD display for providing a UI to a user of the device. Display device 130 together with touch sensor panel 124, when located partially or entirely under the touch sensor panel, can form a touch screen.

Note that one or more of the functions described above can be performed by firmware stored in memory (e.g. one of the peripherals 104 in FIG. 1) and executed by panel processor 102, or stored in program storage 132 and executed by host processor 128. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding a signal) that can contain or store the program for use by or in connection with the instruction execution system, apparatus, or device. The non-transitory computer readable medium storage can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Figure 2:
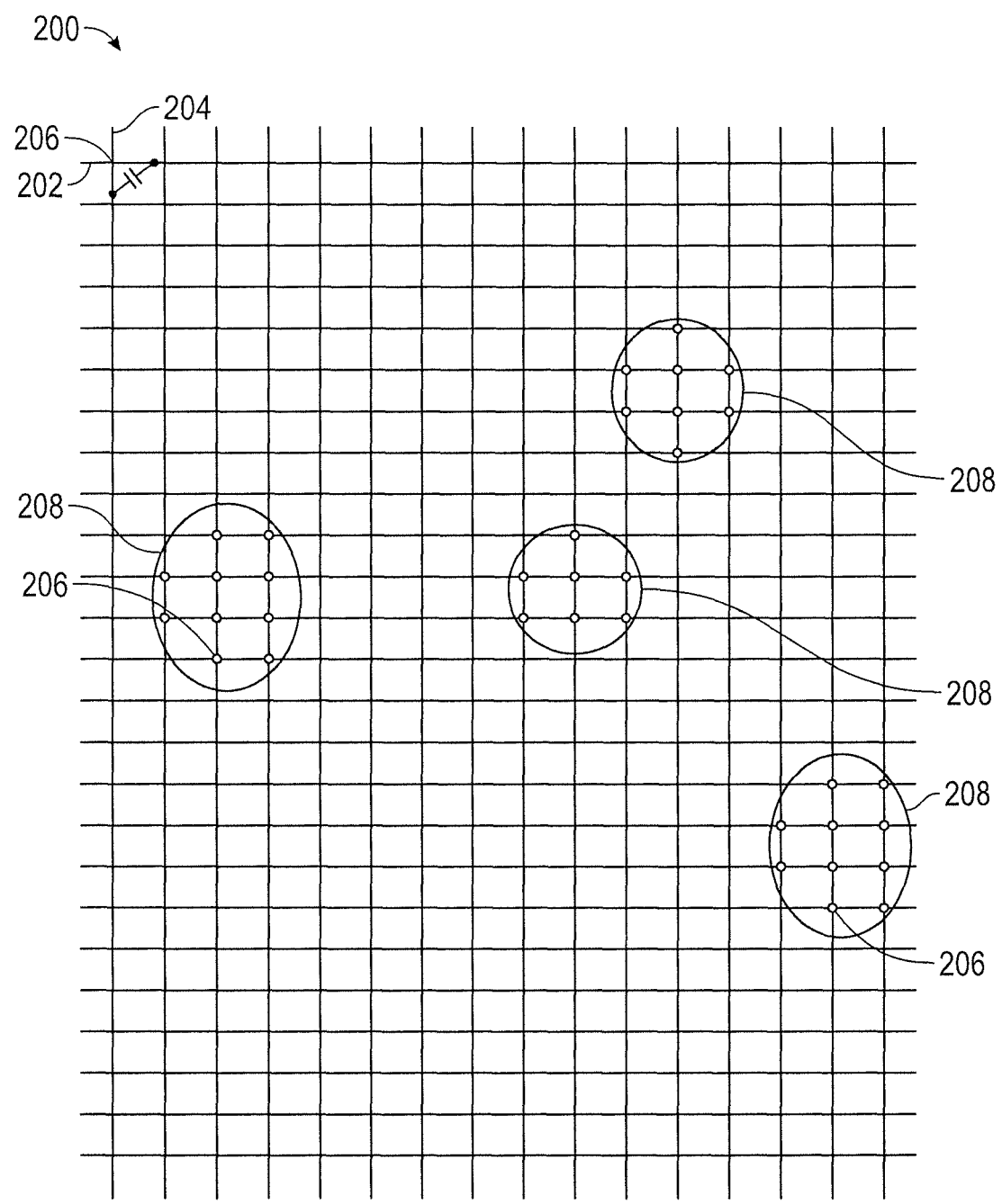
FIG. 2 illustrates an exemplary image of touch according to examples of the disclosure.

As discussed above, signals generated at the touch nodes of touch screen 124 can be viewed as an image of the touch. FIG. 2 illustrates an exemplary image of touch according to examples of the disclosure. Touch screen 200 can include drive lines 202 and sense lines 204 arranged as a pattern of rows and columns, although other patterns can be possible. Touch nodes 206 can be formed at the intersection between drive lines 202 and sense lines 204. Each object touching or hovering over the touch screen 200 (i.e., proximate to the touch screen) can produce a signal at proximate touch nodes 206. Signals from proximate touch nodes 206 can be grouped together to form input patches 208. Thus, the input patches 208 can be regions within the image of touch corresponding to touch nodes 206 having signal values produced by an objection touching or hovering over the touch screen 200.

Various characteristics can be computed for each input patch that can be used for further processing. For example, each input patch can be represented by an ellipse defined by a centroid, major and minor axis lengths and a major axis orientation. Additionally, the total signal and signal density for each input patch can be computed. For example, an input patch's total signal can be calculated by summing the square of the signal value at each touch node in the input patch.

Thus, total signal for an input patch can be expressed mathematically as in Equation (1):

$$Z_P = \sum_{i,j \text{ in } p} [V_{[i][j]}^2] \quad (1)$$

where $Z_P$ can represent the total signal for an input patch, V can represent the signal value at a touch node and i, j can represent the row and column coordinate of each touch node. In some examples, the signal value at each touch node can be calibrated before computing the total signal.

An input patch's signal density can be computed based on the input patch's total signal. In some examples, an input patch's signal density can be calculated by dividing the total signal for an input patch by the geometric mean radius of the input patch. In other examples, the input patch's signal density can be calculated by dividing the total signal for an input patch by the number of touch nodes in the input patch. Thus, signal density for an input patch can be expressed mathematically, for example, as in Equations (2) or (3):

$$Z_{density,p} = \frac{Z_p}{\text{geometric mean radius of } P} \quad (2)$$

$$Z_{density,p} = \frac{Z_p}{\text{number of touch nodes forming } P} \quad (3)$$

Figure 3:
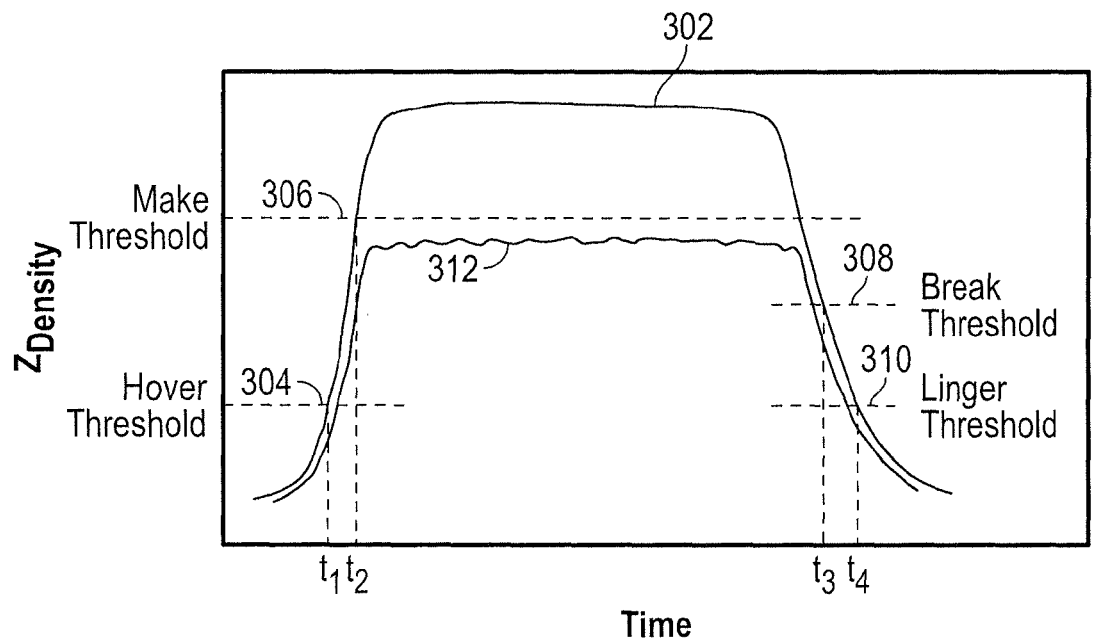
FIG. 3 illustrates an exemplary signal density diagram for an object touching and lifting off a touch sensor panel according to examples of the disclosure.

In some examples, an input patch's signal density, $Z_{density}$, can be used to discriminate between an object hovering over the surface of a touch sensor panel and an object touching the surface of a touch sensor panel. FIG. 3 illustrates an exemplary signal density diagram for an object touching and lifting off a touch sensor panel according to examples of the disclosure. In the example of FIG. 3, various signal density thresholds can be defined. A hover threshold 304 can be defined as the signal density at which point the touch sensing system can identify an input patch representative of an object hovering over the touch sensor panel. In other words, the hover threshold can be the signal density at which the system determines that an object is hovering over, but not touching, the touch sensor panel. A "make" threshold 306 can be defined as the signal density at which point the touch sensing system can identify an input patch representative of an object touching the touch sensor panel. In other words, the "make" threshold can be the signal density at which the system determines that an object is touching the touch sensor panel. A break threshold 308 can be defined as the signal density at which point the touch sensing system can identify an input patch representative of an object lifting off the touch sensor panel. In other words, the break threshold can be the signal density at which the system determines that an object has lifted off the touch sensor panel. A linger threshold 310 can be defined as the signal density at which point the touch sensing system can identify an object as no longer hovering over the touch sensor panel. In other words, the linger threshold can be the signal density at which the system determines that an object that was once hovering over the touch sensor panel has now moved away from the touch sensor panel. In some examples, the linger threshold 310 and hover threshold 304 can be at the same signal density value.

Representative curve 302 illustrates an input patch that can correspond to an object, such as a finger or stylus, approaching, touching and lifting off the touch sensor panel.

At time $t_1$, $Z_{density}$ of the input patch can reach the hover threshold 304 and the input patch can be identified as hovering over the touch sensor panel. At time $t_2$, $Z_{density}$ of the input patch can reach the "make" threshold 306 and the input patch can be identified as touching the touch sensor panel. At time $t_3$, $Z_{density}$ of the input patch can reach the break threshold 308 and the input patch can be identified as lifting off the touch sensor panel. In some examples, the break threshold 308 can be set to be a percentage of the "make" threshold 306, although other values can be chosen. At time $t_4$, $Z_{density}$ of the input patch can reach the linger threshold 310 and the input patch can be identified as no longer hovering over the touch sensor panel.

Identification of and discrimination between these types of touch-surface inputs can permit an associated device to be controlled in a more robust manner. For example, in one example, detection of an object hovering over a touch sensor panel can be used to transition the device from one operational state (e.g., off) to another (e.g., on). In another example, an object touching the surface of the touch sensor panel (e.g., $Z_{density}$ of the input patch reaches or exceeds the "make" threshold) can be used to select an element of a graphical user interface, whereas objects that hover over the surface of the touch sensor panel (e.g., $Z_{density}$ of the input patch fails to reach the "make" threshold) can be ignored.

Setting inappropriate "make" threshold values can cause errors. For example, setting the "make" threshold too low can cause the touch sensor circuitry to be oversensitive to hovering events and mistakenly identify them as touch events (i.e. false positives).

In some cases, a barrier between an object and a touch sensor panel can cause the $Z_{density}$ of intended touches to fail to reach the "make" threshold. For example, a user can be wearing one or more gloves or have a bandage one or more fingers. In other examples, skin conditions such as callouses or other thick patches of dead skin can also create these barriers. Touches through such a barrier (generally, "gloved touches") can be more distant from touch nodes of the touch sensor panel and thus can have a lower total signal and signal density. As a result, although intended as touches, some gloved touches can fail to reach the "make" threshold and can be ignored by the touch sensor circuitry. Referring back to FIG. 3, representative curve 312 illustrates the signal density of an input patch that can correspond to a gloved object, such as a gloved finger, approaching, touching and lifting off the touch sensor panel. In the example of FIG. 3, $Z_{density}$ of a gloved touch patch exceeds hover threshold 304, but in some cases cannot reach "make" threshold 306. As discussed above, the "make" threshold 306 can be lowered to detect such gloved touches, but lowering the "make" touch threshold 306 can cause the system to be oversensitive to touches made without a barrier ("ungloved touches").

Figure 4:
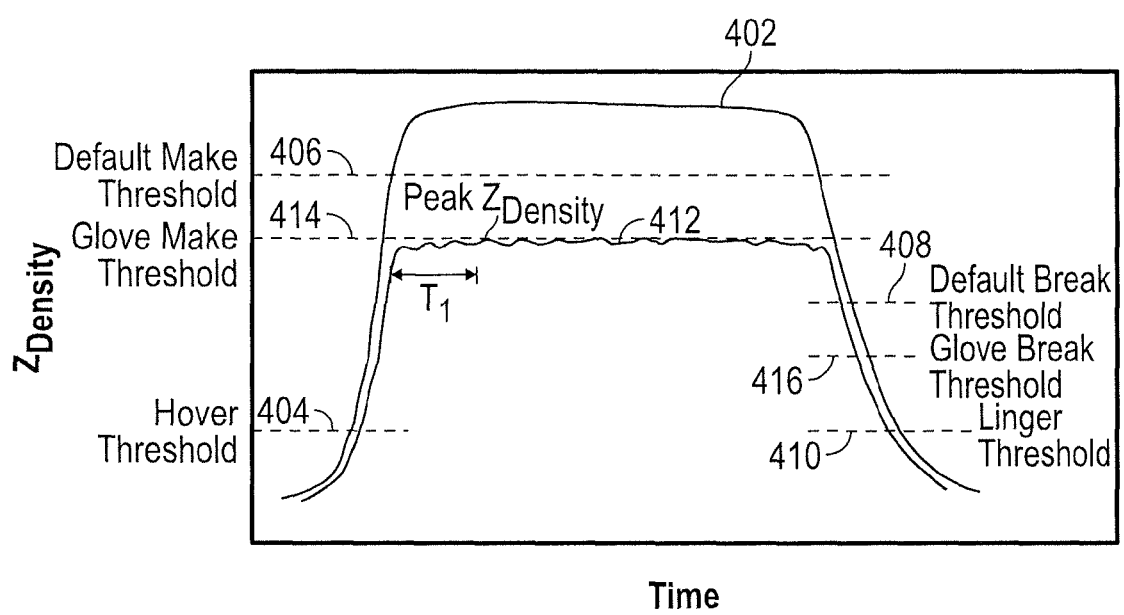
FIG. 4 illustrates an exemplary method of dynamically adjusting the conditions for identifying input patches as touching a touch sensitive device to detect gloved touches according to examples of the disclosure.

FIG. 4 illustrates an exemplary method of dynamically adjusting the conditions for identifying input patches as touching a touch sensitive device to detect gloved touches according to examples of the disclosure. Curve 402 can represent an input patch from an object without any barrier ("ungloved patch") approaching, touching and lifting off the touch sensor panel, as discussed above. The ungloved patch can be identified as hovering once $Z_{density}$ reaches or exceeds hover threshold 404, as touching when the $Z_{density}$ reaches or exceeds a default "make" threshold 406 and lifting off when $Z_{density}$ declines below the default break threshold 408. The ungloved patch can be identified as no longer hovering over the touch sensor panel once $Z_{density}$ falls below linger threshold 410.

Curve 412 can represent an input patch from an object with a barrier ("gloved patch") approaching, touching and lifting off the touch sensor panel. The gloved patch can be identified as hovering once $Z_{density}$ reaches or exceeds hover threshold 404, but as discussed above, $Z_{density}$ can in some cases not reach the default "make" threshold 406. Instead, a gloved patch can be identified as touching the touch sensor panel if $Z_{density}$ satisfies one or more stability conditions. For example, a gloved patch can be identified as touching the touch sensor panel if $Z_{density}$ remains stable for a period T1. For the purpose of calculating the gloved touch break threshold, in some examples the gloved touch "make" threshold 414 can be the peak $Z_{density}$ during period T1. The gloved patch break threshold 416 can be set, in some examples, to be a percentage of the glove touch "make" threshold 414, although other values may also be chosen. The gloved patch can be identified as lifting off when $Z_{density}$ declines below the glove touch break threshold 416. The gloved patch can be identified as no longer hovering over the touch sensor panel once $Z_{density}$ falls below linger threshold 410.

As discussed above, an input patch can be identified as touching the touch sensor panel if $Z_{density}$ remains stable for a period T1. In some examples, determining the stability of $Z_{density}$ during period T1 can be implemented used a leaky accumulator. For example, $Z_{density}$ can be determined to be stable if a leaky accumulator model applied to a $Z_{density}$ unsmoothness measure (i.e. a measure of how unsmooth or unstable the $Z_{density}$ signal is) reaches zero, or within a tolerance value of zero, during T1. In one example, $Z_{density,smooth}$ can measure the smoothness of $Z_{density}$ in time, an dcan be computed by combining a current measurement of $Z_{density}$ and a previous measure of $Z_{density,smooth}$. In some examples, the combination can be a weighted linear combination of the current measurement of $Z_{density}$ and the previous measure of $Z_{density,smooth}$. The unsmoothness measure, $Z_{density,unsmoothness}$, can accumulate the difference between a current $Z_{density}$ and $Z_{density,smooth}$ each time period. $Z_{density,unsmoothness}$ can be capped at zero and can leak based on a leak coefficient, α.

In some examples, the stability condition can be implemented such that a gloved patch can be identified as touching the touch sensor panel only if the stability condition can be satisfied within a particular window of time from first detecting the patch (i.e a window of interest). Limiting the window in which to satisfy the stability condition can help avoid identifying an input patch undesired contact as a gloved touch inadvertently (i.e. false positive). For example, the window of interest can begin at the first frame, i.e. the image of touch frame in which the input patch can be first detected, and can end after a number of frames that can correspond to a maximum number of frames necessary to achieve the stability condition for a desired gloved touch. The maximum number of frames can be set based on observations of how many frames can be necessary for a gloved patch to satisfy the stability condition.

In other examples, rather than using a leaky accumulator model applied to the $Z_{density}$ unsmoothness measure, $Z_{density}$ can be determined to be stable based on the stability of the total absolute error in $Z_{density}$ across a group of frames, e.g. n frames. For example, an average $Z_{density}$ can be computed from $Z_{density}$ measurements taken during each of the frames in the group of n frames. The average $Z_{density}$ can be defined as shown in equation 4:

$$Z_{density,avg} = \sum_{i=1}^{n} \frac{Z_{density,i}}{n} \quad (4)$$

where $Z_{density,i}$ can be the $Z_{density}$ for $i^{th}$ frame and n can be the number of frames. An absolute error can be calculated for the $Z_{density}$ measurement of each frame, by taking the absolute value of the difference between the $Z_{density}$ measurement for each frame and the average $Z_{density}$ across the group of frames. The absolute error for each frame can be summed to measure the total absolute error for the group of frames. The total absolute error can be defined as shown in equation 5:

$$\text{total absolute error} = \sum_{i=1}^{n} |Z_{density,i} - Z_{density,avg}| \quad (5)$$

where $Z_{density,i}$ can be the $Z_{density}$ for $i^{th}$ frame, n can be the number of frames in the group and $Z_{density,avg}$ can be the average $Z_{density}$ for the input patch across the group of frames.

The group of frames can be selected from sequential frames (e.g. frames 0-5) and a subsequent group of frames can be selected from overlapping sequential frames (e.g. frames 1-6). If the total absolute error in $Z_{density}$ of a gloved patch over a group of frames can remain stable for a period T1 during the window of interest, a gloved patch can be identified as touching the touch sensor panel.

Figure 5:
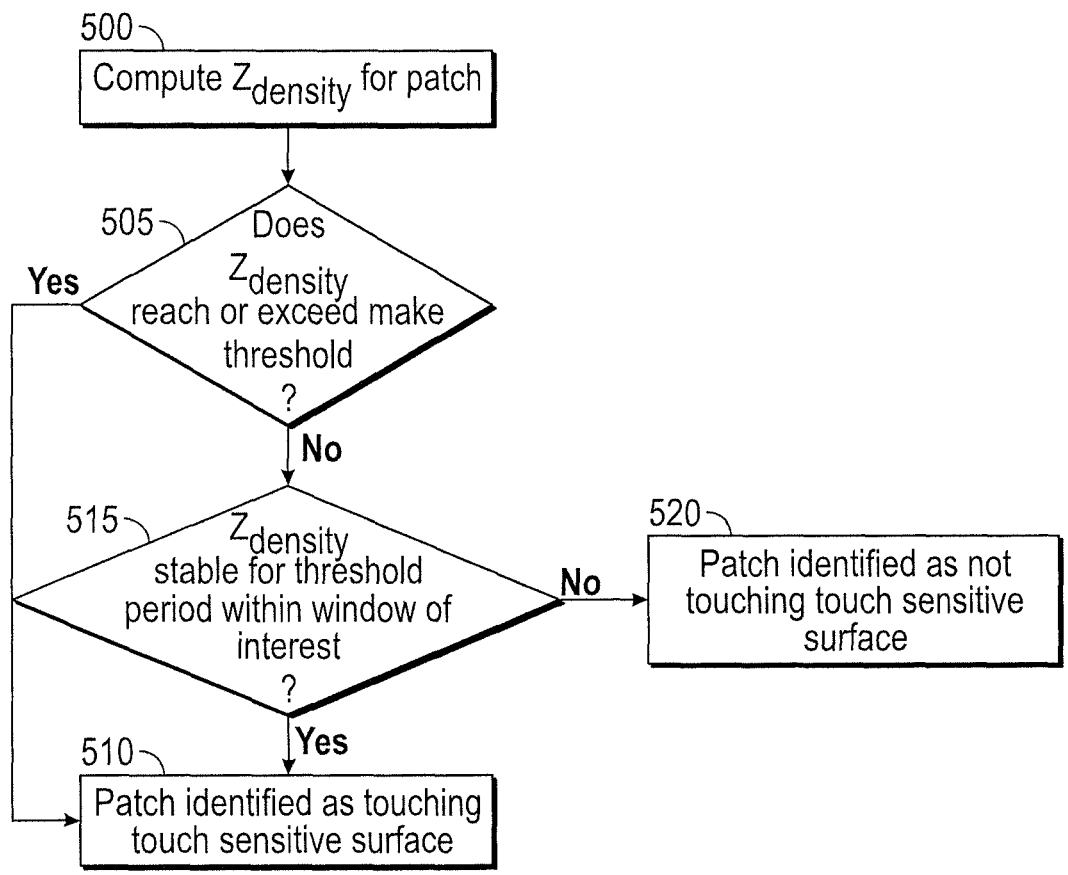
FIG. 5 illustrates an exemplary algorithm for dynamically adjusting the conditions for identifying input patches as touching a touch sensitive device to detect gloved touches according to examples of the disclosure.

FIG. 5 illustrates an exemplary algorithm for dynamically adjusting the conditions for identifying input patches as touching a touch sensitive device to detect gloved touches according to examples of the disclosure. For each input patch in the touch image, a signal density $Z_{density}$ can be determined (500). The system can determine whether the input patch $Z_{density}$ reaches or exceeds a "make" threshold (505). In some examples, the "make" threshold can be the default "make" threshold. In other examples, discussed below, the "make" threshold used can be different than the default "make" threshold. If the input patch $Z_{density}$ reaches or exceeds the "make" threshold, the input patch can be identified as touching the touch sensor panel for further processing (510). If the input patch $Z_{density}$ does not reach or exceed the "make" threshold, the system can determine whether $Z_{density}$ is stable for a threshold period of time within a window of interest (515). If $Z_{density}$ is not stable for the threshold period of time within the window of interest, the input patch can be identified as not touching the touch sensor panel (520). If $Z_{density}$ is stable for the threshold period of time within the window of interest, the patch can be identified as touching the touch sensor panel for further processing (510).

Identifying gloved touches using a stability threshold can result in false positives, such as by identifying an input patch as a gloved touch when in reality the patch can be an ungloved finger hovering over the touch sensitive surface. In some examples, the number of false positives can be reduced based on differences in the shape of the input patch. For example, an input patch from a hovering finger can be rounded, whereas an input patch from a finger (gloved or ungloved) contacting a touch screen can be flattened. Thus, by determining if the shape of an input patch exceed a flatness threshold, the input patch can correspond to an object touching the touch sensitive surface. In some examples, a measure of flatness can be based on a dispersion image. The presence or absence of peaks in a dispersion image (discussed below) corresponding to the location of an input patch can be used to determine whether the input patch satisfying the $Z_{density}$ stability threshold corresponds to a gloved touch or a false positive.

As discussed above with respect to FIG. 2, an image of touch can be formed based on signals measured at each touch node. In some examples, an image formed from the raw data, i.e. a proximity image, can be further processed before identifying various patches. For example, a filtered or smoothed version of the proximity image can be generated prior to segmentation (i.e. the process that generates distinct patches) can reduce the number of spurious peaks and can thus help reduce over segmentation. The smoothing process can, for example, average the signal from each touch node with its nearest neighboring touch nodes in accordance with a discrete diffusion operation. In another examples, both temporal (e.g., obtaining multiple images over a period of time) and spatial (e.g., averaging neighboring touch nodes) smoothing operations can be used. A dispersion image, e.g. a high-pass filtered version of the proximity image, can be computed, for example using an unsharp masking that subtracts the smoothed image from the proximity image. Large values in the dispersion image can correspond to peaks whereas low values or zero values in the dispersion image can correspond to areas with no peaks. As discussed above, the dispersion image can be used to distinguish between gloved touches and false positive. For example, if a the dispersion image contains values which exceed a threshold, i.e. sharp peaks, at locations corresponding to a gloved patch that satisfied the stability condition, the gloved patch can be identified as not touching the surface of the touch sensitive surface. If, however, the dispersion image contains values which are below a threshold, i.e. no sharp peaks, at locations corresponding to a gloved patch that satisfied the stability condition, the gloved patch can be identified as touching the touch sensitive surface.

Figure 10:
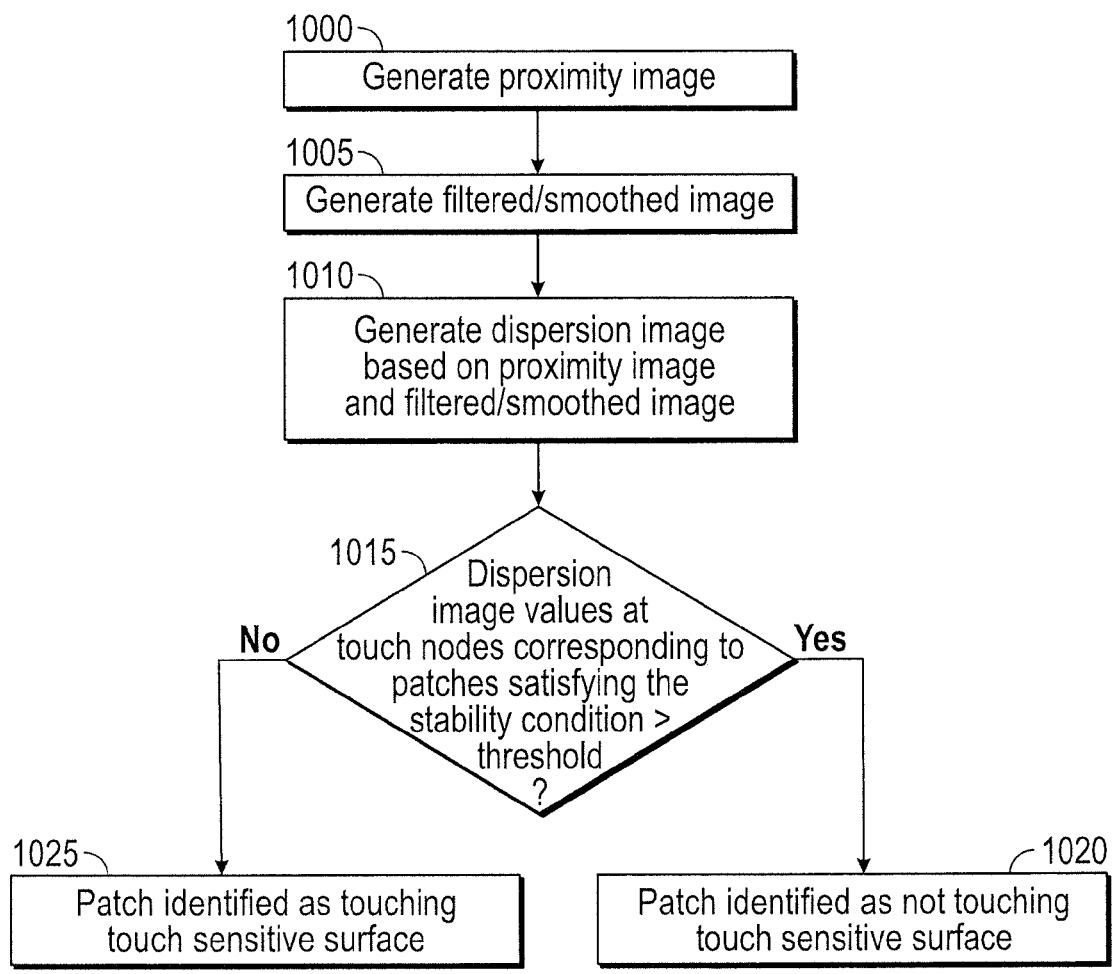
FIG. 10 illustrates an exemplary algorithm for reducing false positive gloved touches using a dispersion image according to examples of the disclosure.

FIG. 10 illustrates an exemplary algorithm for reducing false positive gloved touches using a dispersion image according to examples of the disclosure. The system can generate a proximity image from the signal contributions of each touch node (1000). The system can generate a smoothed image based on the proximity image (1005). In some examples, the smoothed image can be smoothed based on averaging the signal value of each touch node with the signal value of its nearest neighboring touch nodes. The system can generate a dispersion image based on the proximity image and the smoothed image (1010). In some examples, the dispersion image can be generated by subtracting the smoothed image signal values from the proximity image signal values. The system can compare dispersion values from touch nodes that correspond to a gloved patch that satisfies a stability condition with a threshold value (1015). If the dispersion values fail to reach the threshold, the patch can be identified as touching the touch sensitive surface (1020). If the dispersion values exceed the threshold, the patch can be identified as not touching the touch sensitive surface (1025).

In other examples, in order to avoid false positive gloved touches, a gloved patch can be identified as touching the touch sensitive surface when the input patch satisfies the stability condition and the input patch exhibits characteristics consistent with contact between and an object and the surface of a touch screen. For example, if user input (e.g. gesture) fails to produce a desired result, the natural behavior of a user can be to repeat the gesture. Thus, users can intuitively tap a user interface element, such as a button, more than once if the first attempt to activate the user interface element fails. As a result, the system can look for satisfaction of the stability threshold for an input patch and repeated detection of the input patch corresponding to the same object tapping the touch sensitive surface two or more times in the same location to identify the input patch as a gloved touch. Although the above example describes a tapping input, other inputs or gestures can be repeated and detection of repeated user input can be combined with satisfaction of the stability condition in order to identify an input patch as a gloved touch. As discussed in more detail below, after identifying gloved touches, the "make" threshold can be lowered to simplify detection of subsequent gloved touches. Thus, subsequent gloved touches can be detected without the user repeating the same input in order to have the desired input be detected as a gloved touch. In other examples, the system can look for satisfaction of the stability threshold as well as movement of the input patch by a threshold distance (e.g. 1-10 mm), to identify the touch patch as a gloved touch. The combination of the stability threshold and the movement can be a strong indication that a gloved patch can be an object, such as a gloved finger, touching the surface during the movement, rather than a false positive.

Figure 11:
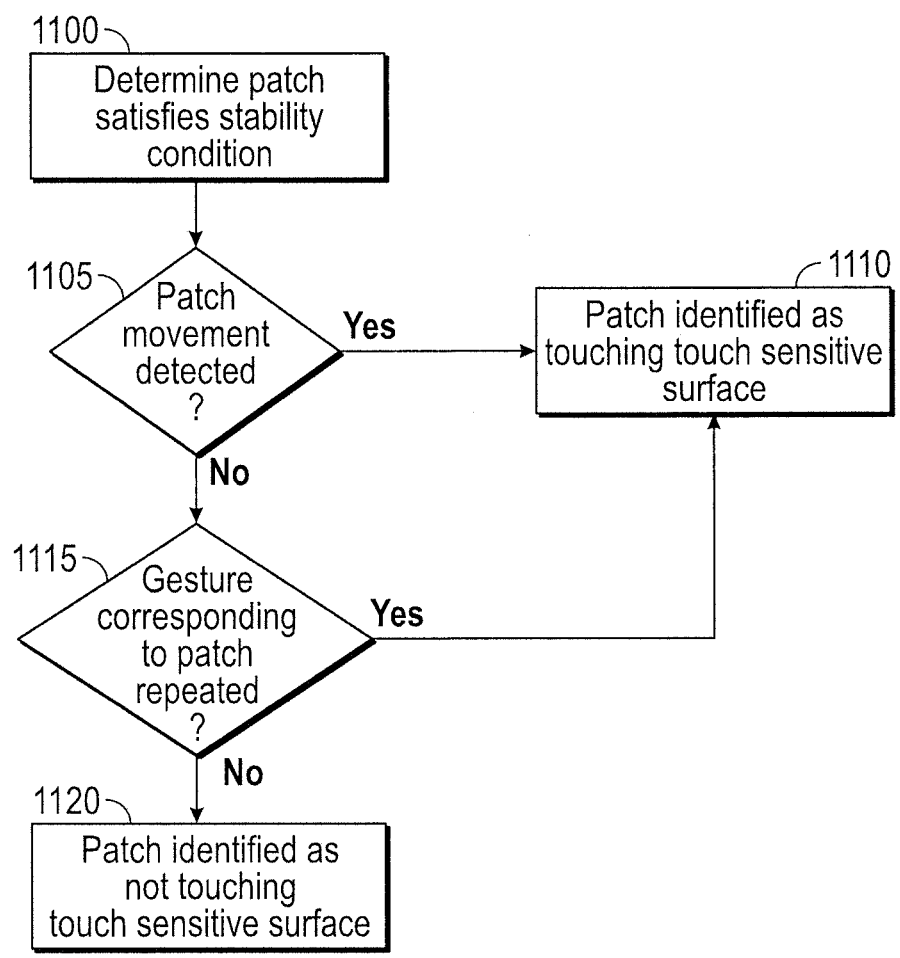
FIG. 11 illustrates an exemplary algorithm for reducing false positive gloved touches based on repetition or motion characteristics of an input patch according to examples of the disclosure.

FIG. 11 illustrates an exemplary algorithm for reducing false positive gloved touches based on repetition or motion characteristics of an input patch according to examples of the disclosure. The system can determine that an input patch satisfies a $Z_{density}$ stability condition (1100). The system can detect whether the patch moves more than a threshold distance between frames (1105). If the patch moves more than the threshold distance, the patch can be identified as touching the touch sensitive surface (1110). If the patch fails to move more than the threshold distance, the system can determine whether the gesture corresponding to the patch, such as a tap gesture, is repeated (1115). If the gesture is repeated the patch can be identified as touching the touch sensitive surface (1110). If the gesture is not repeated the patch can be identified as not touching the touch sensitive surface (1120). Although described and illustrated as sequential conditions, in some examples the movement condition at 1105 and the repetition condition at 1115 can be performed independently or in a different order.

Determining whether $Z_{density}$ is stable for a threshold period of time can introduce a delay in detecting a gloved touch. In order to improve performance for subsequent gloved touches, a history of current and/or recent (e.g within a number of seconds since liftoff) input patches identified as touches ("touch patches") can be used to dynamically adjust the "make" threshold. The history can include, for example, the coordinates and the peak $Z_{density}$ of each touch patch. The "make" touch threshold for new input patches can be computed using a weighted average of the history of current and/or recent touch patches. Recent touch patches that are closer to a new input patch can be weighted higher than distant touch patches in determining a "make" threshold for the new input patch. For example, the "make" threshold can be set to be a percentage of the weighted average peak $Z_{density}$, although other values may also be chosen.

Figure 6:
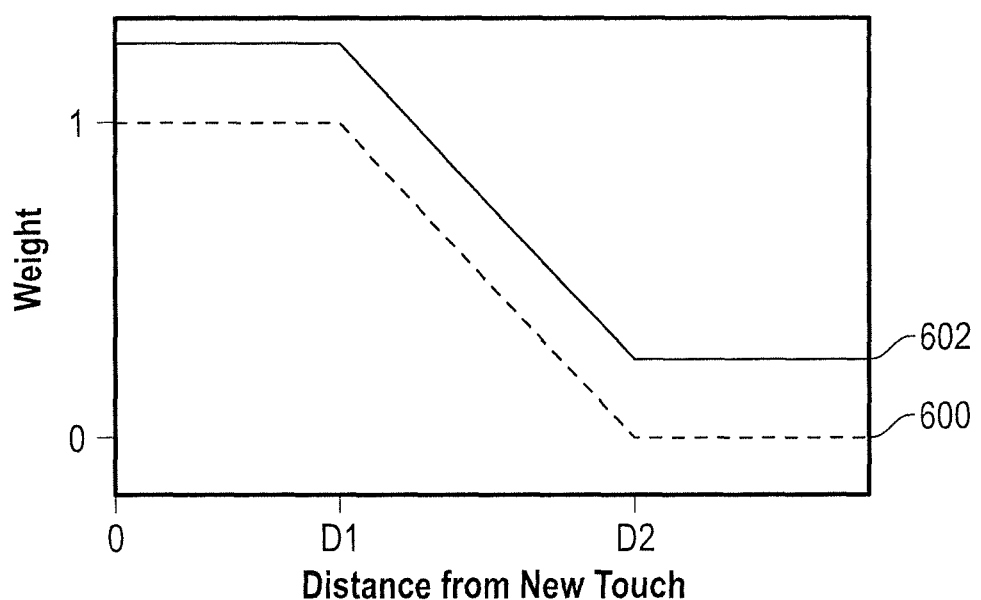
FIG. 6 illustrates exemplary weightings that can be applied to recent touch patches used for computing a weighted average "make" threshold according to examples of the disclosure.

FIG. 6 illustrates exemplary weightings that can be applied to recent touch patches used for computing a weighted average "make" threshold according to examples of the disclosure. In the example of curve 600, touch patches within distance D1 of a new input patch can be weighted 1 (ie. full weight), touch patches beyond a distance D2 of the new input patch can be weighted 0 (i.e. not included in the weighted average), and touch patches between D1 and D2 of the new input patch can be weighted by linearly interpolating the weighting between 0 and 1. In other examples, as illustrated by curve 602, an predetermined offset can be used so that each touch patch can contribute to the weighted average. Touch patches within distance D1 of a new patch can be weighted more than 1 (maximum weighting value), touch patches beyond a distance D2 of the new patch can be weighted with a value between 0 and 1 (minimum weighting value), and touch patches between D1 and D2 of the new patch can be weighted by linearly interpolating the weighting between the maximum and minimum weighting values, although it should be understood that other weights may also be chosen. The $Z_{density}$ contribution of each touch patch can be the peak $Z_{density}$ of the touch patch. In other examples, in order to reduce the contribution of high $Z_{density}$ touch patches which can overwhelm lower $Z_{density}$ touch patches in computing the weighted average, the peak $Z_{density}$ can be limited, for example, to a multiple of the default "make" threshold (e.g. a multiple between 1 and 2).

Figure 7A:
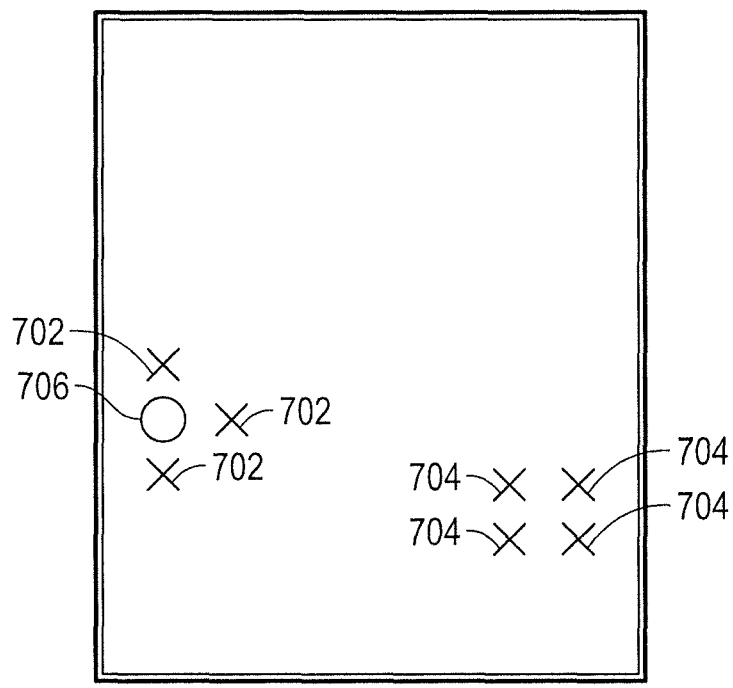
FIGS. 7A-7C illustrate exemplary methods to dynamically adjust the "make" threshold using a history of current and/or recent touches on a touch sensor panel according to examples of the disclosure.
Figure 7B:
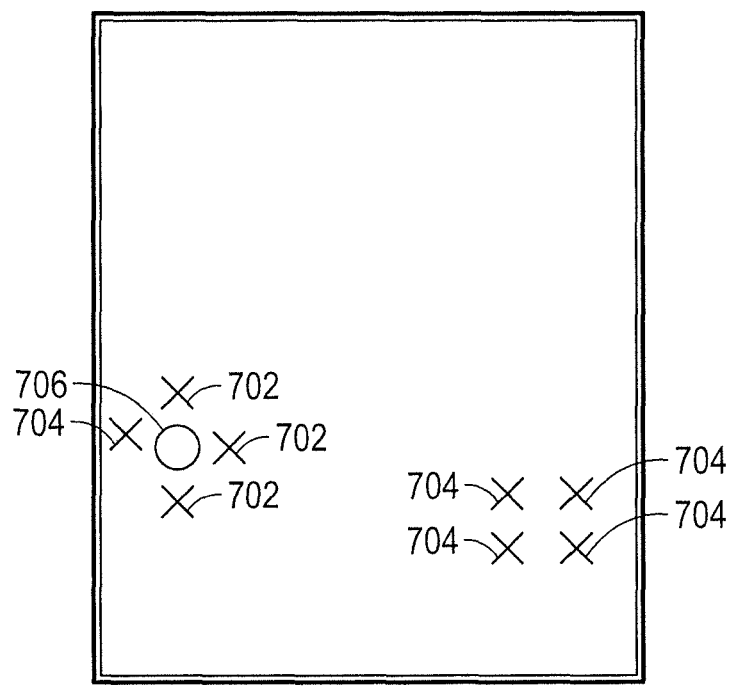
Figure 7C:
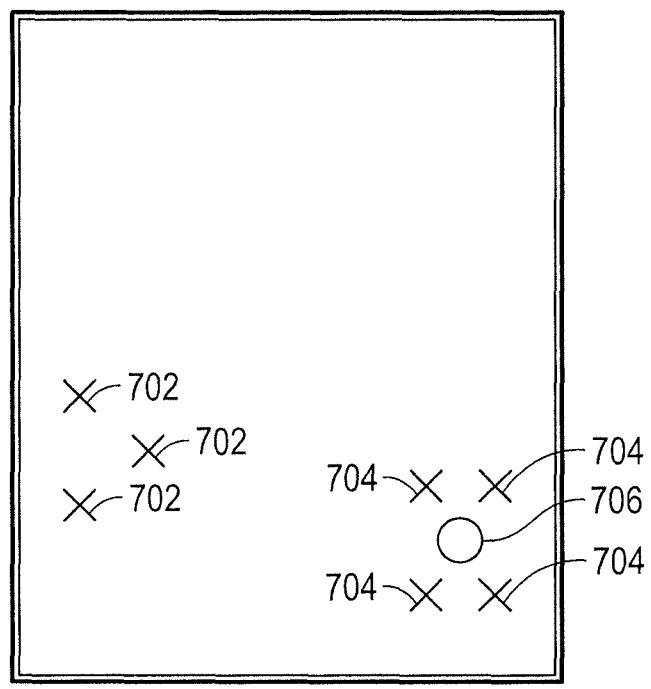

FIGS. 7A through 7C illustrate exemplary methods to dynamically adjust the "make" threshold using a history of current and/or recent touches on a touch sensor panel according to examples of the disclosure. FIG. 7A illustrates a new input patch 706 an a number of recent gloved touches 702 and ungloved touches 704. As discussed above, the history can include the coordinates and the peak $Z_{density}$ of each recent touch. Each touch patch in the history can be weighted as discussed above based on their proximity to new input patch 706. For example, gloved touches 702 can be proximate to new input patch 706 and their peak $Z_{density}$ contributions can have a weighting equal to the maximum weighting value, whereas ungloved touches 704 can be distant from new input patch 706 and their peak $Z_{density}$ contributions can have a weighting equal to the minimum weighting value. As a result, the "make" threshold used to identify new input patch 706 as a touch can be set to be a percentage of the weighted average of all recent touches, in one example, although other values may also be chosen. The weighted average can be biased toward the peak $Z_{density}$ of the proximate gloved touches 702. In the case that new input patch 706 is a gloved patch, it can be identified as a gloved touch based on the reduced "make" touch threshold without introducing a delay using the stability threshold.

In order to reduce the risk of oversensitivity, if the total weight of ungloved touches exceeds a total weight threshold, then the default "make" touch threshold can be used. For example, FIG. 7B illustrates a new input patch 706 proximate to gloved touches 702 and ungloved touch 704 and distant from ungloved touches 702. The peak $Z_{density}$ contributions from gloved touches 702 and proximate ungloved touch 704 can have a weighting equal to the maximum weighting value, whereas the peak $Z_{density}$ contributions from distant ungloved touches 702 can have a weighting equal to the minimum weighting value. In some examples, the total weight of ungloved touches can be calculated by summing the maximum weighting value from proximate ungloved touch 704 and the minimum weighting value from each of the distant ungloved touches 704, which can be in excess of a total weight threshold. When the total weight of ungloved touches exceeds the total weight threshold, the default "make" threshold can be used for the new input patch 706 instead of the reduced touch threshold based on the weighted average of all touches. By setting the total weight threshold to close to but below the maximum weighting value, a single proximate ungloved touch (weighted with the maximum weighting value) can effectively overrule numerous gloved touches and avoid oversensitivity.

FIG. 7C illustrates a new input patch 706 proximate to ungloved touches 704 and distant from gloved touches 702. The peak $Z_{density}$ contributions from ungloved touches 704 can have a weighting equal to the maximum weighting value, whereas the peak $Z_{density}$ contributions from gloved touches 702 can have a weighting equal to the minimum weighting value. As a result, the "make" threshold used to identify new input patch 706 can be set to a percentage of the weighted average of all touches, biased by the proximate ungloved touches 702, although other values can be chosen. In the case that new input patch 706 is an ungloved patch, the "make" threshold used can be based on the weighted average of recent ungloved touches. In other examples, the default "make" threshold can be used if the weighted average of recent ungloved touches exceeds the default "make" threshold. If the new input patch 706 is a gloved patched, it can still be identified as touching using the $Z_{density}$ stability threshold.

In some examples, a new input patch can be identified as having the same path identification (path ID) as a recent touch patch and therefore can be interpreted as having been made by the same object. A path tracking process can be used chain together patches from successive images of touch which correspond to the same physical object. The path tracking process can decide which current patches should be matched with which recent touches, for example based on being within a distance known as the tracking radius of one another and within a within a time period (e.g. a second). Path tracking can also be used to aid in detection of repetitive taps of the same finger or object over the same location. If an input patch is identified as having the same path ID, instead of computing the weighted average of peak $Z_{density}$ for all of the recent touches patches, the new input patch can use a "make" threshold that can be set to a percentage of the peak $Z_{density}$ of the recent touch patch with same path ID, although other values can be chosen.

Figure 8:
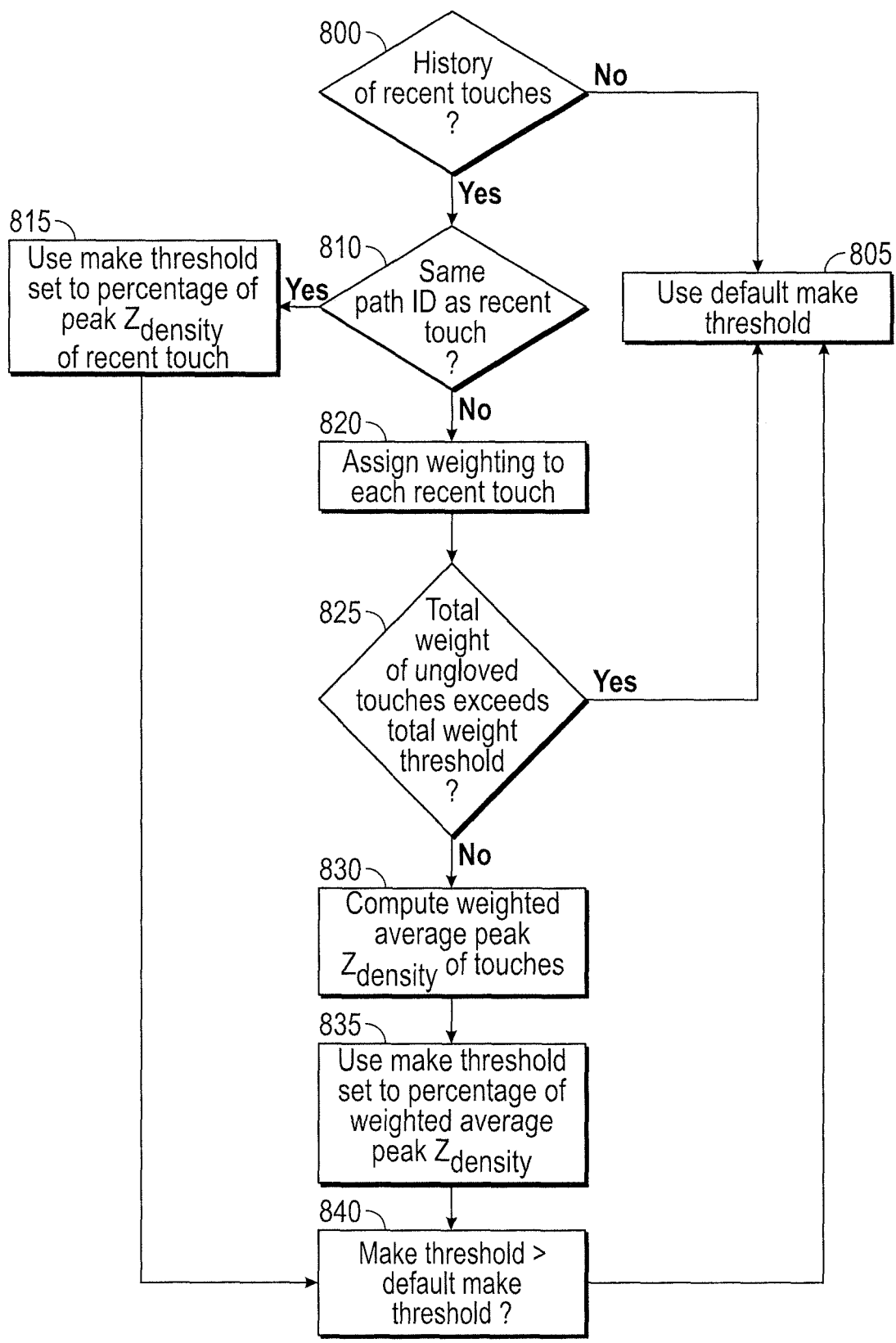
FIG. 8 illustrates an exemplary algorithm for dynamically adjusting a "make" threshold for an input patch according to examples of the disclosure.

FIG. 8 illustrates an exemplary algorithm for dynamically adjusting a "make" threshold for an input patch according to examples of the disclosure. The system can determine whether there is a history of recent touches (800). If there is no history of recent touches, the system can use the default "make" threshold to determine if an input patch can be identified as a touch (805). If there is a history of recent touches, the system can determine whether the new input patch has the same path ID as a recent touch patch (810). If the new input patch has the same path ID as the recent touch patch, the system can use a "make" threshold that is a percentage of the peak $Z_{density}$ of the recent touch patch (815). If the new input patch does not have the same path ID as the recent touches, the system can assign weighting to each recent touch (820). The system can determine if the total weight of recent ungloved touches exceeds a total weight threshold (825). If the total weight of recent ungloved touches exceeds the total weight threshold, the system can use the default "make" threshold (805). If the total weight of recent ungloved touches does not exceed the total weight threshold, the system can compute a weighted average of peak $Z_{density}$ of touches (830) and use a "make" threshold that is a certain percentage of the weighted average peak $Z_{density}$ of the recent touches (835). If the "make" threshold of 815 or 835 exceeds the default "make" threshold, the default "make" threshold can be used instead (840).

Figure 9A:
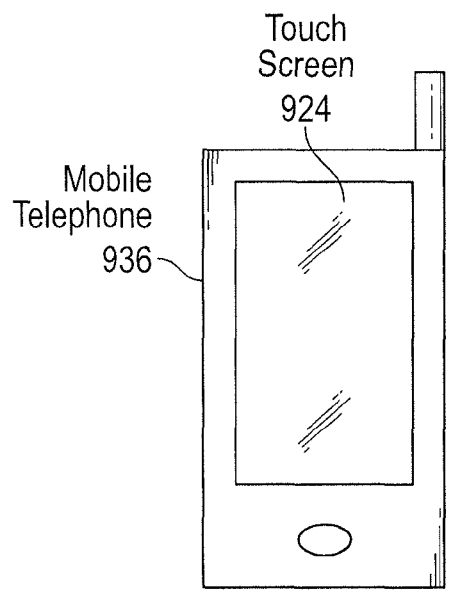
FIGS. 9A-9D illustrate example systems in which dynamically adjusting the conditions for identifying input patches as touching a touch sensitive device according to examples of the disclosure can be implemented.
Figure 9B:
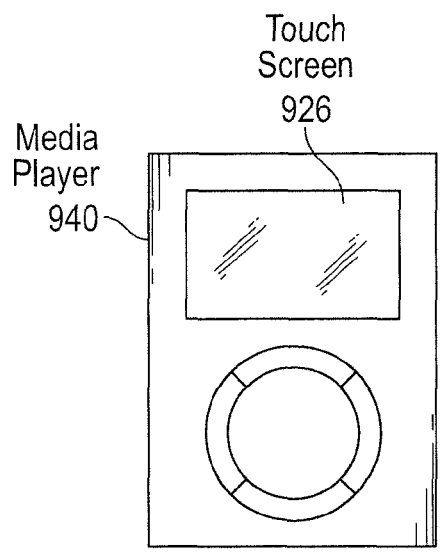
Figure 9C:
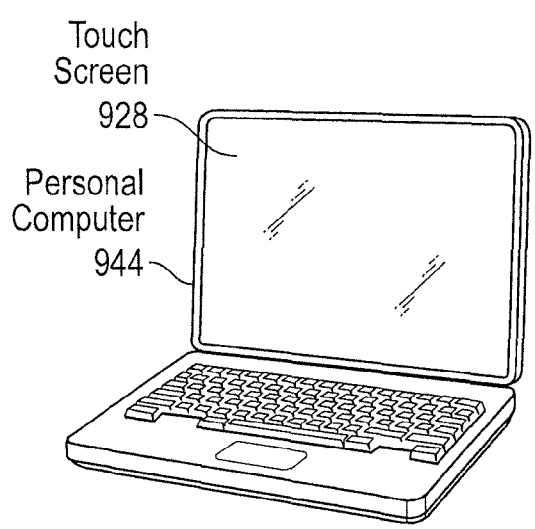
Figure 9D:
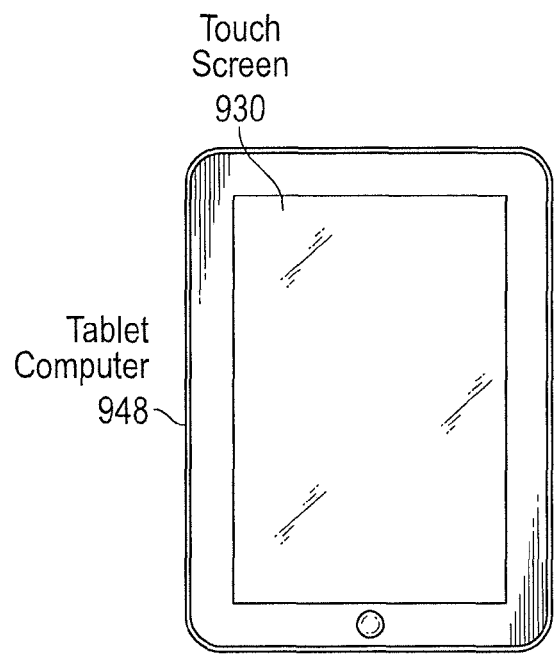

FIGS. 9A-9D illustrate example systems in which dynamically adjusting the conditions for identifying input patches as touching a touch sensitive surface according to examples of the disclosure can be implemented. FIG. 9A illustrates an example mobile telephone 936 that includes a touch screen 924 and other computing system blocks that can implement dynamically adjusting the conditions for identifying input patches as touching the touch screen according to various examples. FIG. 9B illustrates an example digital media player 940 that includes a touch screen 926 and other computing system blocks that can implement dynamically adjusting the conditions for identifying input patches as touching the touch screen according to various examples. FIG. 9C illustrates an example personal computer 944 that includes a touch screen 928 and other computing system blocks that can implement dynamically adjusting the conditions for identifying input patches as touching the touch screen according to various examples. FIG. 9D illustrates an example tablet computing device 948 that includes a touch screen 930 and other computing system blocks that can implement dynamically adjusting the conditions for identifying input patches as touching the touch screen according to various examples. The touch screen and computing system blocks that can implement dynamically adjusting the conditions for identifying input patches as touching the touch screen can be implemented in other devices including in wearable devices.

Therefore, according to the above, some examples of the disclosure are directed to a touch detection method. The method can comprise identifying at least one patch from a touch image of one or more objects proximate to a touch sensitive surface, determining a signal density of the at least one patch, determining whether the signal density of the at least one patch reaches or exceeds a make threshold, the make threshold dynamically adjusted based on one or more recent contacts; and in response to determining that the signal density of the at least one patch reaches or exceeds the make threshold, determining that the object is contacting the touch sensitive surface. Additionally or alternatively to one or more examples disclosed above, dynamically adjusting the make threshold can comprise identifying the at least one patch as corresponding to at least one of the one or more recent contacts, and adjusting the make threshold based on a peak signal density of the at least one corresponding recent contact. Additionally or alternatively to one or more examples disclosed above, dynamically adjusting the make threshold can comprise weighting the one or more recent contacts, determining an average peak signal density of the one or more weighted recent contacts, and adjusting the make threshold based on the average peak signal density of the one or more weighted recent contacts. Additionally or alternatively to one or more examples disclosed above, dynamically adjusting the make threshold can further comprise weighting the one or more recent contacts based on their proximity to the at least one patch. Additionally or alternatively to one or more examples disclosed above, the method further comprises capping the peak signal density for each of the plurality of recent touches. Additionally or alternatively to one or more examples disclosed above, dynamically adjusting the make threshold can further comprise weighting the one or more recent contacts, determining a total weight of the one or more recent contacts with a peak signal density above a default make threshold, determining that the total weight exceeds a total weight threshold, and adjusting the make threshold to the default make threshold based on the determination that the total weight exceeds the total weight threshold. Additionally or alternatively to one or more examples disclosed above, the make threshold can be less than or equal to a default make threshold.

Other examples of the disclosure are directed to a touch detection method. The method can comprise identifying at least one patch from a touch image of one or more objects proximate to a touch sensitive surface, determining a signal density of the at least one patch, determining that each of one or more conditions are satisfied, the one or more conditions including a condition that the signal density of the at least one patch is stable for a threshold period of time within a window of interest, and in response to determining that each of the one or more conditions are satisfied, determining that the object is contacting the touch sensitive surface. Additionally or alternatively to one or more examples disclosed above, the one or more conditions can further include a condition that the at least one input patch exceeds a movement threshold. Additionally or alternatively to one or more examples disclosed above, the one or more conditions can further include a condition that the at least one input patch corresponds to a repeated gesture. Additionally or alternatively to one or more examples disclosed above, the one or more conditions can further include a condition that the shape of the at least one patch exceeds a flatness threshold. Additionally or alternatively to one or more examples disclosed above, determining whether the at least one patch exceeds the flatness threshold can comprise generating a dispersion image and determining a region of the dispersion image corresponding to the at least one input patch contains no peaks above a threshold value.

Other examples of the disclosure are directed to a non-transitory computer readable storage medium, the computer readable storage medium containing instructions that, when executed, perform a touch detection method. The method can include identifying at least one patch from a touch image of one or more objects proximate to a touch sensitive surface, determining a signal density of the at least one patch, determining that each of one or more conditions are satisfied, the one or more conditions including a condition that the signal density of the at least one patch is stable for a threshold period of time within a window of interest, in response to determining that each of the one or more conditions are satisfied, determining that the object is contacting the touch sensitive surface. Additionally or alternatively to one or more examples disclosed above, the one or more conditions can further include a condition that the at least one input patch exceeds a movement threshold. Additionally or alternatively to one or more examples disclosed above, the one or more conditions can further include a condition that the at least one input patch corresponds to a repeated gesture. Additionally or alternatively to one or more examples disclosed above, the one or more conditions can further include a condition that the shape of the at least one patch exceeds a flatness threshold. Additionally or alternatively to one or more examples disclosed above, determining whether the at least one patch exceeds the flatness threshold can comprise generating a dispersion image and determining a region of the dispersion image corresponding to the at least one input patch contains no peaks above a threshold value.

Other examples of the disclosure are directed to an electronic device. The device comprising a touch sensitive surface and a processor. The processor can be capable of identifying at least one patch from a touch image of one or more objects proximate to a touch sensitive surface and determining a signal density of the at least one patch. The processor can be further capable of determining whether the signal density of the at least one patch reaches or exceeds a signal density threshold, the signal density threshold dynamically adjusted based on one or more recent contacts and in response to determining that the signal density of the at least one patch reaches or exceeds the signal density threshold, determining that the object is contacting the touch sensitive surface. Additionally or alternatively to one or more examples disclosed above, dynamically adjusting the signal density threshold can comprise identifying the at least one patch as corresponding to at least one of the one or more recent contacts; and adjusting the signal density threshold based on a peak signal density of the at least one corresponding recent contact. Additionally or alternatively to one or more examples disclosed above, dynamically adjusting the signal density threshold can comprise weighting the one or more recent contacts, determining an average peak signal density of the one or more weighted recent contacts, and adjusting the signal density threshold based on the average peak signal density of the one or more weighted recent contacts. Additionally or alternatively to one or more examples disclosed above, dynamically adjusting the signal density threshold can comprise weighting the one or more recent contacts based on their proximity to the at least one patch. Additionally or alternatively to one or more examples disclosed above, dynamically adjusting the signal density threshold can comprise capping the peak signal density for each of the plurality of recent touches. Additionally or alternatively to one or more examples disclosed above, dynamically adjusting the signal density threshold can comprise weighting the one or more recent contacts, determining a total weight of the one or more recent contacts with a peak signal density above a default signal density threshold, determining that the total weight exceeds a total weight threshold, and adjusting the signal density threshold to the default signal density threshold based on the determination that the total weight exceeds the total weight threshold. Additionally or alternatively to one or more examples disclosed above, the signal density threshold can be less than or equal to a default signal density threshold.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A touch detection method comprising:
   identifying at least one patch from a touch image of one or more objects proximate to a touch sensitive surface;
   determining a signal density of the at least one patch;
   determining whether the signal density of the at least one patch reaches or exceeds a first threshold, the first threshold dynamically adjusted based on at least one or more previous contacts; and
   in response to determining that the signal density of the at least one patch reaches or exceeds the first threshold, determining that the object is contacting the touch sensitive surface.

2. The method of claim 1, wherein dynamically adjusting the first threshold comprises:
   identifying the at least one patch as corresponding to at least one of the one or more previous contacts; and
   adjusting the first threshold based on a peak signal density of the at least one corresponding previous contact.

3. The method of claim 1, wherein dynamically adjusting the first threshold further comprises:
   weighting the one or more previous contacts;
   determining an average peak signal density of the one or more weighted previous contacts; and
   adjusting the first threshold based on the average peak signal density of the one or more weighted previous contacts.

4. The method of claim 3, further comprising:
   weighting the one or more previous contacts based on their proximity to the at least one patch.

5. The method of claim 3, further comprising:
   capping the peak signal density for each of the one or more recent touches.

6. The method of claim 1, wherein dynamically adjusting the first threshold comprises:
   weighting the one or more previous contacts;
   determining a total weight of the one or more previous contacts with a peak signal density above a second threshold;
   determining that the total weight exceeds a third threshold; and
   adjusting the first threshold to the second threshold based on the determination that the total weight exceeds the third threshold.

7. The method of claim 1, wherein the first threshold is less than or equal to a second threshold.

8. An electronic device, comprising:
   a touch sensitive surface; and
   a processor capable of:
   identifying at least one patch from a touch image of one or more objects proximate to a touch sensitive surface;
   determining a signal density of the at least one patch;
   determining whether the signal density of the at least one patch reaches or exceeds a signal density threshold, the signal density threshold dynamically adjusted based on at least one or more previous contacts; and
   in response to determining that the signal density of the at least one patch reaches or exceeds the signal density threshold, determining that the object is contacting the touch sensitive surface.

9. The electronic device of claim 8, wherein dynamically adjusting the signal density threshold comprises:
   identifying the at least one patch as corresponding to at least one of the one or more previous contacts; and
   adjusting the signal density threshold based on a peak signal density of the at least one corresponding previous contact.

10. The electronic device of claim 8, wherein dynamically adjusting the signal density threshold further comprises:
    weighting the one or more previous contacts;
    determining an average peak signal density of the one or more weighted previous contacts; and
    adjusting the signal density threshold based on the average peak signal density of the one or more weighted previous contacts.

11. The electronic device of claim 10, wherein dynamically adjusting the signal density threshold further comprises:
    weighting the one or more previous contacts based on their proximity to the at least one patch.

12. The electronic device of claim 10, wherein dynamically adjusting the signal density threshold further comprises:
    capping the peak signal density for each of the one or more previous touches.

13. The electronic device of claim 10, wherein the signal density threshold is less than or equal to a default signal density threshold.

14. The electronic device of claim 8, wherein dynamically adjusting the signal density threshold comprises:
    weighting the one or more previous contacts;

determining a total weight of the one or more previous contacts with a peak signal density above a default signal density threshold;

determining that the total weight exceeds a total weight threshold; and adjusting the signal density threshold to the default signal density threshold based on the determination that the total weight exceeds the total weight threshold.

15. A non-transitory computer readable storage medium, the computer readable storage medium containing instructions that, when executed, perform a touch detection method, the method comprising:

identifying at least one patch from a touch image of one or more objects proximate to a touch sensitive surface;

determining a signal density of the at least one patch;

determining whether the signal density of the at least one patch reaches or exceeds a first threshold, the first threshold dynamically adjusted based on at least one or more previous contacts; and in response to determining that the signal density of the at least one patch reaches or exceeds the first threshold, determining that the object is contacting the touch sensitive surface.

16. The non-transitory computer readable storage medium of claim 15, wherein dynamically adjusting the first threshold comprises:

identifying the at least one patch as corresponding to at least one of the one or more previous contacts; and adjusting the first threshold based on a peak signal density of the at least one corresponding previous contact.

17. The non-transitory computer readable storage medium of claim 15, wherein dynamically adjusting the first threshold further comprises:

weighting the one or more previous contacts;

determining an average peak signal density of the one or more weighted previous contacts; and adjusting the first threshold based on the average peak signal density of the one or more weighted previous contacts.

18. The non-transitory computer readable storage medium of claim 17, further comprising:

weighting the one or more previous contacts based on their proximity to the at least one patch.

19. The non-transitory computer readable storage medium of claim 15, wherein dynamically adjusting the first threshold comprises:

weighting the one or more previous contacts;

determining a total weight of the one or more previous contacts with a peak signal density above a second threshold;

determining that the total weight exceeds a third threshold; and adjusting the first threshold to the second threshold based on the determination that the total weight exceeds the third threshold.

20. The non-transitory computer readable storage medium of claim 15, wherein the first threshold is less than or equal to a second threshold.

* * * * *